Patented Feb. 14, 1933

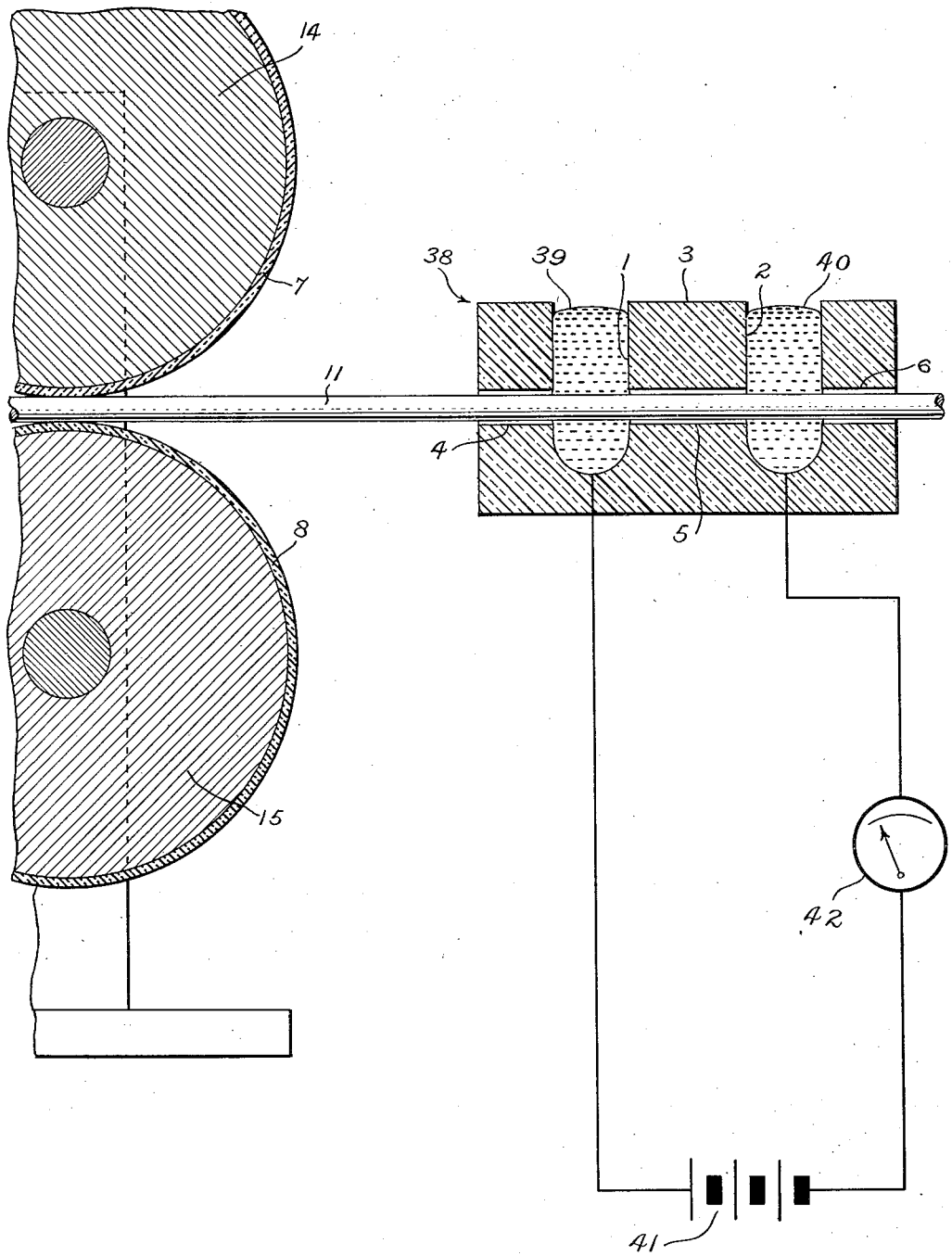

1,897,330

UNITED STATES PATENT OFFICE

HAROLD PENDER, OF MERION, PENNSYLVANIA, ASSIGNOR TO INTERNATIONAL RESISTANCE COMPANY, OF PHILADELPHIA, PENNSYLVANIA, A CORPORATION OF DELAWARE

APPARATUS FOR TESTING RESISTANCE

Original application filed May 28, 1925, Serial No. 33,327, and in Germany August 8, 1925. Divided and application filed August 16, 1929, Serial No. 386,385. Again divided and this application filed January 15, 1932. Serial No. 586,730.

This invention relates to apparatus for testing the resistance of resistance material, and with regard to its more specific features to an apparatus for testing the ohmic resistance of rod or fibre-like resistance elements.

One object of the invention is to provide a testing apparatus by means of which the resistance of a resistance element can be accurately determined. Another object of the invention is to provide a testing apparatus adapted to determine quickly the electrical resistance of an object. Another object of the invention is to provide a testing apparatus adapted to disclose the variations of resistance per linear distance for different parts of the same object. Another object of the invention is to permit such variations to be determined quickly. Another object of the invention is to provide a reliable testing apparatus of simple construction dependable in use.

The invention accordingly consists in the features of construction, combinations of elements, and arrangements of parts as will be exemplified in the structure to be hereinafter described, and the scope of the application of which will be indicated in the following claims.

This application is a division from my copending application Serial Number 386,385, filed August 16, 1929, which was a division from my copending application Serial Number 33,327, filed May 28, 1925, upon which Letters Patent Number 1,771,055 were granted July 22, 1930.

In the accompanying drawing, which is illustrative of one of various possible embodiments of my invention, there is shown a part of the testing apparatus in vertical section, a piece of material being tested being shown in elevation, and the remainder of the testing apparatus being shown in conventional electrical diagrammatic form.

Referring now to the drawing, a device 38, which may be made of any good insulating substance, contains two mercury contacts 39 and 40 spread a predetermined distance apart. Across these two contacts is connected a battery 41 and a suitable resistance measuring device 42, which may be an ordinary "megger". The battery 41 constitutes a source of constant voltage electricity, while the "megger" actually responds to variations in current flow, and this may be calibrated in terms of resistance because the circuit responds to the law $C=E/R$. The "megger" 42 thus gives a constant reading of the resistance of any article which extends through the two mercury contacts 39 and 40.

The mercury contacts 39 and 40 comprise liquid mercury received in cup portions 1 and 2 respectively of the device 38. Extending through the cup portions 1 and 2 and through the central dividing wall 3 which separates these cup portions 1 and 2 in a straight line are bores or passages 4, 5 and 6 which are large enough to receive freely material to be tested, such as a rod or filament 11. In Patent No. 1,771,055 there is described a process for producing resistance filament consisting of a continuous glass fibre coated with a baked coating of carbonaceous substance, and the testing apparatus which is the subject of this application is specifically adapted to test such a type of resistance element. As described in said patent, the resistance element 11, comprising a long length of glass fibre coated as specified, may be continuously fed through the passages 4, 5 and 6, and the needle of the "megger" 42 will show whether or not ohmic resistance divided by linear distance is constant over different portions of the elements, as well as the absolulte value of the resistance at any given portion of the resistance element 11. The operator can readily tell whether or not the resistance per linear distance of the resistance material 11 falls below or rises above some established limit of tolerance. Thus may resistance material be checked as it is being produced, and all not up to a given standard discarded, and by means of my testing apparatus cost of production is greatly decreased, as the production apparatus described in the aforementioned patent may be adjusted the moment it is determined that it is not meeting its prescribed requirements.

I have found that the mercury 39 and 40 is spaced a constant distance apart in the cups 1 and 2 and does not run out through the bores 4, 5 and 6 or any of them, owing to the fact that the cohesive force of liquid mercury is relatively high as compared with its adhesive force for most foreign substances. Included in such substances which have small adhesive attraction for mercury are most insulators.

It will be noted that the resistance material 11 is shown as a straight piece of material, and that it may be readily placed in the passages 4, 5 and 6 of the device 38 and when so placed spaced portions thereof are completely covered by the liquid mercury 39 and 40. This is an important feature of the invention, for in many prior testing devices, either the material to be tested had to be bent, or mere surface contact (as distinguished from submerged contact) relied upon. So far as certain aspects of the invention are concerned, however, any spaced fungible conductors might be substituted for the contacts 39 and 40. By "fungible" I means to include liquids and finely divided solids as well as plastic substances.

The apparatus may also be used for testing resistance material entirely apart from the process of or apparatus for making it. Such testing may be very quickly performed, and the "megger" 42 may be calibrated to read in terms of megohms per inch, or per centimeter, or any other desired scale.

Resistance filament 11 of the type described in the aforesaid Patent No. 1,771,055 may be produced in large quantity, and is ready for incorporation in resistance units when it has been sorted, tested for uniformity and graded according to resistance value. Such sorting, testing and grading are important steps in the operation of any plant which manufactures resistors, and with a reliable testing apparatus even non-uniform resistance material may be salvaged, as it may be cut into lengths just long enough for embodiment in completed resistors, and then sorted or binned with my testing apparatus. An important feature of my apparatus is that, in such testing or sorting, there are no contacts to be adjusted, and the result is not in error due to variations of pressure at the contacting point, as is the case with solid terminal testing apparatus. The contact resistance is a large factor in the total resistance of a carbon article, but by the wide area liquid metal contact secured in my apparatus, this source of error and particularly of variable error is largely eliminated. The operator sorting or binning the resistance material inserts the same in the passages 4, 5 and 6 and reads the results on the "megger" 42.

When the resistance material 11 is fed through the device 38 by power, it may be pushed or drawn by a pair of rollers 14 and 15. The peripheries of these feed rollers 14 and 15 are preferably covered with a yielding material such as leather 7 and 8, and these rollers grip the material 11, drawing it through the mercury 39 and 40. The operator thus has merely to watch the "megger" 42 to find the resistance value thereof. In some cases, a recording instrument might be substituted for the operator's eye.

It will thus be seen that there has been provided by this invention an apparatus in which the various objects hereinabove set forth, together with many thoroughly practical advantages, are successfully achieved.

As various possible embodiments might be made of the mechanical features of the above invention, and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. Resistance measuring apparatus comprising a pair of cups, liquid in said cups, passages extending through said cups and connecting them whereby a straight piece of material may be passed through the liquid being covered thereby, and an electric circuit including a resistance measuring instrument connecting said cups.

2. Resistance measuring apparatus as claimed in claim 1 in which the liquid is mercury.

3. Resistance measuring apparatus comprising a constant voltage source of electricity, a pair of fungible conducting contacts, means spacing said contacts a constant distance apart, an electrical instrument responding to variations of current, and connections making an open circuit through the foregoing, open between said contacts.

In testimony whereof, I have signed my name to this specification this 13th day of January, 1932.

HAROLD PENDER.